United States Patent
Park et al.

(10) Patent No.: US 10,702,068 B2
(45) Date of Patent: Jul. 7, 2020

(54) CONTROL SYSTEM AND METHOD FOR CONTROLLING MOTION CHAIR BASED ON PHYSICAL DATA OF AUDIENCE

(71) Applicant: CJ 4DPLEX CO., LTD., Seoul (KR)

(72) Inventors: Hyun Park, Seongnam-si (KR); Hyukju Kwon, Gimpo-si (KR); Myung Chul Kim, Seoul (KR)

(73) Assignee: CJ 4DPLEX CO., LTD., Seoul (KR)

( * ) Notice: Subject to any disclaimer, the term of this patent is extended or adjusted under 35 U.S.C. 154(b) by 516 days.

(21) Appl. No.: 15/507,624

(22) PCT Filed: Aug. 26, 2015

(86) PCT No.: PCT/KR2015/008922
§ 371 (c)(1),
(2) Date: Feb. 28, 2017

(87) PCT Pub. No.: WO2016/032226
PCT Pub. Date: Mar. 3, 2016

(65) Prior Publication Data
US 2017/0290431 A1    Oct. 12, 2017

(30) Foreign Application Priority Data

Aug. 28, 2014  (KR) ........................ 10-2014-0113334

(51) Int. Cl.
| | |
|---|---|
| *A47C 1/122* | (2006.01) |
| *A47C 31/00* | (2006.01) |
| *A47C 1/12* | (2006.01) |
| *A47C 3/02* | (2006.01) |

(Continued)

(52) U.S. Cl.
CPC ................. *A47C 1/122* (2013.01); *A47C 1/12* (2013.01); *A47C 3/02* (2013.01); *A47C 31/008* (2013.01); *G06Q 10/101* (2013.01); *G06Q 50/10* (2013.01)

(58) Field of Classification Search
CPC ........... A47C 1/122; A47C 31/00; A47C 1/12; A47C 3/02; G06Q 50/10; G06Q 10/101
See application file for complete search history.

(56) References Cited

U.S. PATENT DOCUMENTS

2010/0090507 A1    4/2010    Boulais et al.

FOREIGN PATENT DOCUMENTS

| CN | 1575745 A | 2/2005 |
|---|---|---|
| CN | 101077255 A | 11/2007 |
| CN | 102292059 A | 12/2011 |

(Continued)

OTHER PUBLICATIONS

International Search Report for application No. PCT/KR2015/008922.

(Continued)

*Primary Examiner* — Anthony D Barfield
(74) *Attorney, Agent, or Firm* — Hauptman Ham, LLP (57) ABSTRACT

The present invention relates to a control system and method for controlling a motion chair in a 4D theater and, more particularly, to a control system and method for controlling a motion chair, wherein the physical data of audiences who watch a movie in their motion chairs is collected and the motion intensity of the motion chairs is controlled based on the collected physical data so that the audiences can enjoy a 4D movie in a physical stable state.

3 Claims, 7 Drawing Sheets

(51) Int. Cl.
    *G06Q 50/10*     (2012.01)
    *G06Q 10/10*     (2012.01)

(56)           References Cited

FOREIGN PATENT DOCUMENTS

| | | | |
|---|---|---|---|
| CN | 102728065 A | 10/2012 | |
| CN | 103217965 A | 7/2013 | |
| CN | 203121680 U | 8/2013 | |
| CN | 103330413 A | 10/2013 | |
| CN | 103961891 A | 8/2014 | |
| JP | 06-000209 A | 1/1994 | |
| JP | 07-204167 A | 8/1995 | |
| JP | 2001269377 A | 10/2001 | |
| JP | 2004140812 A | 5/2004 | |
| JP | 2011-514829 A | 5/2011 | |
| KR | 10-1154143 B1 | 6/2012 | |
| KR | 2012-0091806 A | 8/2012 | |
| WO | 2009/114069 A2 | 9/2009 | |
| WO | WO-2013125797 A1 * | 8/2013 | .............. A63J 25/00 |

OTHER PUBLICATIONS

Japanese Office Action dated Feb. 13, 2018, in connection with the Japanese Patent Application No. 2017-531432.
Chinese Office Action dated Nov. 11, 2018, in connection with the Chinese Patent Application No. 201580046004.6.

* cited by examiner

FIG. 8

CONTROL SYSTEM AND METHOD FOR CONTROLLING MOTION CHAIR BASED ON PHYSICAL DATA OF AUDIENCE

CROSS REFERENCE TO RELATED APPLICATION

This present application is a national stage filing under 35 U.S.C § 371 of PCT application number PCT/KR2015/008922 filed on Aug. 26, 2015 which is based upon and claims the benefit of priority to Korean Patent Application Nos. 10-2014-0113334 filed on Aug. 28, 2014 in the Korean Intellectual Property Office. The disclosures of the above-listed applications are hereby incorporated by reference herein in their entirety.

TECHNICAL FIELD

The present invention relates to a control system and method for controlling a motion chair in a 4D theater and, more particularly, to a control system and method for controlling a motion chair, wherein the physical data of audiences who watch a movie in their motion chairs is collected and the motion intensity of the motion chairs is controlled based on the collected physical data so that the audiences can enjoy a 4D movie in a physical stable state.

BACKGROUND ART

Recently, a theater, that is, the space in which audiences can watch movie content, is greatly improved along with the diversity of the movie content. In particular, many operators who manage theaters greatly increase 4D theaters, that is, theaters to which physical effects have been added, which is an extension of a 3D stereoscopic image.

A 4D theater may include various watching elements. A motion chair that belongs to the various watching elements and that enables audiences to directly experience motions synchronized with an image may be said to be an essential watching element of a recent 4D theater.

In general, the motion chair includes an actuator capable of implementing various motions, and it is driven in such a way as to move a chair in a roll, pitch, heave, or sway direction while irregularly operating. Furthermore, the motion chair may include a shaker at the bottom or at the back of a chair in order to provide audiences with a vibration effect.

Most of motion chairs installed in a theater are controlled so that they implement the same motion and vibration intensity with the same strength. The degree of stress applied by a motion of a motion chair may be different for each person who watches a movie. In particular, some audiences have a severe sensation of fear for a vibrant motion of a motion chair and are reluctant to enter a 4D theater.

In order to solve such a problem, there is a need to control a motion of a motion chair depending on the physical state of an audience when audiences watch a 4D movie.

Embodiments of the present invention have been made to solve the problem of a motion chair managed by not taking into consideration the physical state of audiences as described above and have been invented to satisfy the aforementioned technical needs and to provide additional technical elements which may not be easily invented by those skilled in the art.

DISCLOSURE OF INVENTION

Technical Problem

An object of the present invention is to collect the physical data of audiences who watch a 4D movie and control the motion attributes of a motion chair, such as a motion, strength, and vibration intensity.

In particular, an object of the present invention is to provide a proper motion of a motion chair to each audience by collecting the physical data of audiences when the motion chair is in a non-driving state and using the collected physical data as reference data.

Another object of the present invention is to check the physical state of audiences in real time and immediately provide a proper motion of a motion chair to each audience while a movie is screened.

Yet another object of the present invention is to analyze the accumulated physical state of audiences by monitoring so that the analyzed physical state may aid in setting various motion attributes of a motion chair, such as a motion, strength, and vibration intensity.

Solution to Problem

In accordance with an aspect of the present invention, a system for controlling a motion chair includes the motion chair configured to collect the physical data of an audience, send the physical data to a server, and control motion attributes in response to a motion control command received from the server and the server configured to receive the physical data from the motion chair, determine whether a motion of the motion chair needs to be controlled based on the physical data, generate the motion control command based on a result of the determination, and send the motion control command to the motion chair.

In this case, the physical data may include a heart rate, a pulse wave, a brainwave, a body temperature, weight, blood pressure, or the amount of moisture.

Furthermore, in the system for controlling a motion chair, the motion chair may collect the physical data of the audience in a driving state and the physical data of the audience in a non-driving state and send the physical data to the server. In this case, the server stores the physical data collected in the non-driving state as reference data, compares the physical data collected in the driving state with the reference data, determines whether a difference between the physical data collected in the driving state and the reference data is within a predetermined range, and determines whether a motion of the motion chair needs to be controlled based on a result of the determination.

In accordance with another aspect of the present invention, a motion chair includes a monitoring unit configured to collect the physical data of an audience, a chair communication unit configured to send the physical data collected by the monitoring unit to a server, and receive a motion control command from the server, and a motion control unit configured to control the motion attributes of the motion chair in response to the motion control command received from the server.

In the system for controlling a motion chair or the motion chair the monitoring unit may have a band type, a patch type, a chip type, or a necklace type. Furthermore, the motion attributes may include a motion angle, motion speed, motion direction, vibration intensity, or vibration frequency of the motion chair.

In accordance with yet another aspect of the present invention, a server includes a server communication unit configured to receive physical data from a motion chair and send a generated motion control command to the motion chair, an operation unit configured to compare the physical data received from the motion chair with previously stored reference data, determine whether a motion of the motion chair needs to be controlled based on a result of the comparison, and generate the motion control command based on a result of the determination, and a database configured to store the physical data received from the motion chair.

In accordance with further yet another aspect of the present invention, a method of controlling a motion chair includes collecting, by the motion chair, the physical data of an audience and sending the physical data to a server, comparing, by the server, the received physical data with previously stored reference data and determining whether a motion of the motion chair needs to be controlled, sending, by the server, a motion control command to the motion chair based on a result of the determination, and controlling, by the motion chair, motion attributes in response to the motion control command.

Advantageous Effects of Invention

In accordance with the present invention, there is an advantage in that audiences can watch a movie without a difficulty physically and emotionally because the motion attributes of the motion chair are controlled based on the physical state of audiences who watch a 4D movie.

Furthermore, in accordance with the present invention, there is an advantage in that a proper motion of the motion chair can be provided depending on the health state, age, and sex of an audience because audiences can be monitored and the motion chair can be controlled.

Furthermore, in accordance with the present invention, there is an advantage in that the physical data of audiences who watch a 4D movie can be used as reference data when a motion of the motion chair for future other content is implemented because the physical data of the audiences can be accumulatively analyzed.

MODE FOR THE INVENTION

The details of the objects and technical configurations of the present invention and corresponding acting effects will become more clearly understood from the following detailed description based on the drawings accompanied by the specification of the present invention. Hereinafter, embodiments of the present invention are described in detail with reference to the accompanying drawings.

Embodiments disclosed in this specification should not be interpreted or used as limiting the scope of the present invention. It is evident to those skilled in the art that a description including the embodiments of this specification may have various applications. Accordingly, some embodiments of the present invention described in the detailed description of the present invention are illustrative for a better description, and the scope of the present invention is not intended to be limited to the embodiments.

Functional terms illustrated in the drawings and described below are only examples of possible implementations. In other implementations, different functional blocks may be used without departing from the spirit and scope of the detailed description. Furthermore, although one or more functional blocks of the present invention are illustrated as separate blocks, one or more of the functional blocks of the present invention may be a combination of various hardware and software elements executing the same function.

Furthermore, it should be understood that an expression that some elements are "included" is an expression of an "open type" and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

A system for controlling a motion chair 100 in accordance with an embodiment of the present invention and the motion chair 100 and the server 200 which form the system are described in detail below with reference to FIGS. 1 to 3.

Figure 1:
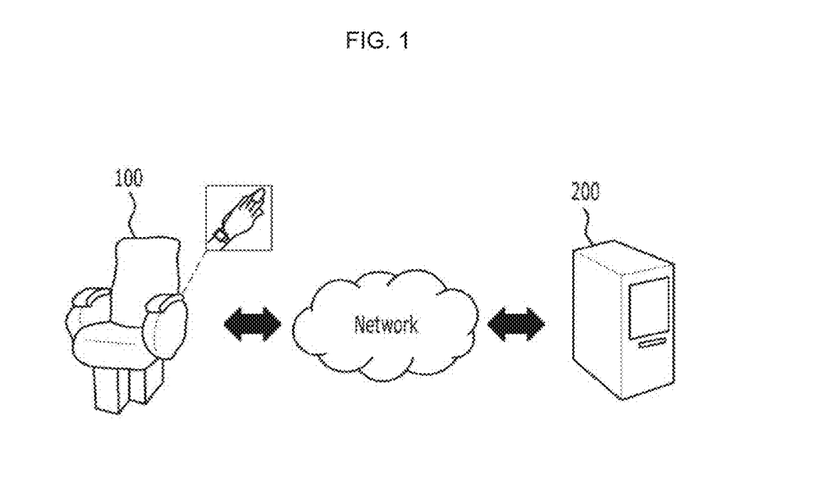
FIG. 1 schematically shows a system for controlling a motion chair in accordance with an embodiment of the present invention.

First, FIG. 1 schematically shows the system for controlling the motion chair 100 in a 4D theater. From FIG. 1, it may be seen that the system includes the motion chair 100 and the server 200 and the motion chair 100 and the server 200 are connected over a wired or wireless network.

The motion chair 100 basically functions to provide a realistic screening environment to audiences through a motion synchronized with movie content. In an embodiment of the present invention, in addition to the basic function, the motion chair 100 further functions to collect the physical data of the audience and send the collected physical data to the server 200 and to receive a motion control command from the server 200 and control a motion of the motion chair 100, that is, the motion attributes of the motion chair 100, in response to the motion control command.

In general, the server 200 refers to a server managed by an entity who provides a screening service. It is based on the premise that the server 200 is connected to a plurality of the motion chairs 100 installed in a theater over a network. The server 200 functions to receive physical data from the motion chairs 100 over a network, determine whether a motion of the motion chairs 100 needs to be controlled based on the physical data, generate a motion control command if it is determined that a motion of the motion chairs 100 needs to be controlled, and send the motion control command to the motion chair 100 to be controlled.

The server 200 may discriminate, receive, and store audience physical data in a "driving state" and audience physical data in a "non-driving state" from the motion chair 100. The server 200 compares current physical data with the stored physical data and determines whether a motion of the motion chair 100 needs to be controlled by determining whether a difference between the current physical data and the stored physical data exceeds a set range. An operation process of determining, by the server 200, whether a motion of the motion chair 100 needs to be controlled, generating a motion control command, and controlling the motion chair 100 is described later.

The motion chair 100, that is, one of the elements of the system for controlling the motion chair 100, is described in more detail below with reference to FIG. 2.

Figure 2:
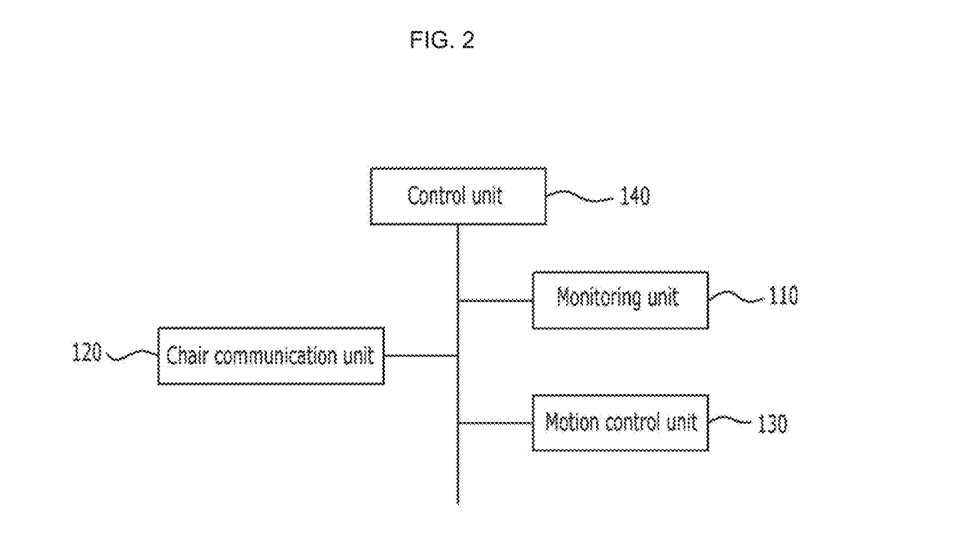
FIG. 2 is a block diagram showing a detailed configuration of a motion chair in accordance with an embodiment of the present invention.

Referring to FIG. 2, the motion chair 100 includes a monitoring unit 110, a chair communication unit 120, a motion control unit 130, and a control unit 140.

The monitoring unit 110 monitors the physical data of audiences who have seated in the motion chairs 100 and simultaneously obtains the physical data of the audiences. The physical data collected by the monitoring unit 110 may include the heart rate, pulse wave, brainwave, body temperature, weight, blood pressure, and/or the amount of moisture of each audience. Various types of the physical data collected as described above are used to check whether the audience has a stable state physically and emotionally in watching 4D content.

The monitoring unit 110 can collect weight of the audience. The reason for this is to provide each audience with a 4D motion of proper strength depending on weight and also properly drive the motion chair 100. That is, if an audience who has set weight or higher is seated in the motion chair 100, the weight of the audience collected by the monitoring unit 110 is transmitted to the server 200. The server 200 controls the motion attributes of the motion chair 100 by taking the weight into consideration so that the motion attributes are not hard on the audience and the motion chair 100.

The monitoring unit 110 may be implemented in various ways. For example, the monitoring unit 110 may be implemented in various ways, such as a band type in which the monitoring unit 110 may be wound in the wrist or ankle of an audience, a patch type in which the monitoring unit 110 may be attached to part of the body of an audience, a chip type in which the monitoring unit 110 may be engaged with part of the body of an audience and obtains physical data, and a necklace type in which the monitoring unit 110 may be wound on the neck of an audience. Furthermore, in addition to the above types, the monitoring unit 110 may be implemented in a type in which a sensor for obtaining physical data is included in 3D glasses or a mobile phone. FIG. 1 illustrates that the motion chair 100 includes the monitoring unit 110 of a chip type.

In some embodiments, the monitoring unit 110 may have a type in which it is connected to the main body of the motion chair 100 through a wire or a type in which it has been buried in the main body of the motion chair 100. Alternatively, the monitoring unit 110 may be present as a separate device independent from the main body of the motion chair 100. In particular, the monitoring unit 110, that is, a separate device independent from the main body of the motion chair 100, needs to include a separate communication unit for data communication with the main body of the motion chair 100. In this case, available wireless communication means may include various short-distance wireless communication means, such as Wi-Fi, infrared communication, Bluetooth, and Zigbee, or wired communication means using a LAN cable.

In the monitoring unit 110, a point of time, time, and a cycle in which the physical data of an audience is monitored may be different depending on user setting. For example, the monitoring unit 110 may be implemented to monitor the physical data of an audience in real time while a 4D movie is screened or to monitor the physical data of an audience at a predetermined point of time or on a predetermined time (e.g., a specific time after the driving of the motion chair 100 starts or a specific time after the driving of the motion chair 100 stopped). That is, a user may set the monitoring start time, monitoring time, and/or monitoring cycle of the monitoring unit 110 and obtain required information.

The chair communication unit 120, that is, another element of the motion chair 100, functions to send the physical data, collected by the monitoring unit 110, to the server 200 and receive the motion control command generated by the server 200. That is, the chair communication unit 120 corresponds to a functional unit for exchanging data with the server 200 connected to the motion chair 100 over a network.

The motion control unit 130, yet another element of the motion chair 100, functions to control the motion attributes of the motion chair 100 in response to the motion control command received from the server 200. The motion attributes means the attributes of various motions which may be implemented by the motion chair 100. For example, the motion attributes may include various attributes for controlling a motion of the motion chair 100, such as how the motion chair 100 will be moved in which one of roll, pitch, yaw, heave, sway, and surge directions (i.e., a direction), how the motion angle of the motion chair 100 will be when the motion chair 100 moves in a specific direction (i.e., a motion angle), that the motion chair 100 will move at what speed (i.e., speed and acceleration), and how the intensity and frequency of vibration will be determined.

The motion control unit 130 may control a motion of the motion chair 100 provided to audiences by controlling such motion attributes in response to the motion control command received from the server 200.

The motion chair 100 may further include the control unit 140 for generally controlling the monitoring unit 110, the chair communication unit 120, and the motion control unit 130. The control unit 140 may include at least one operation device. The operation device may include a central processing unit (CPU), a programmable device (e.g., a CPLD or an FPGA) suitably implemented for a specific purpose, a digital signal processor (DSP), application-specific integrated circuits (ASIC), or a micro micro-controller chip.

The server 200, that is, yet another element of the system for controlling the motion chair 100, is described in detail below with reference to FIG. 3.

Figure 3:
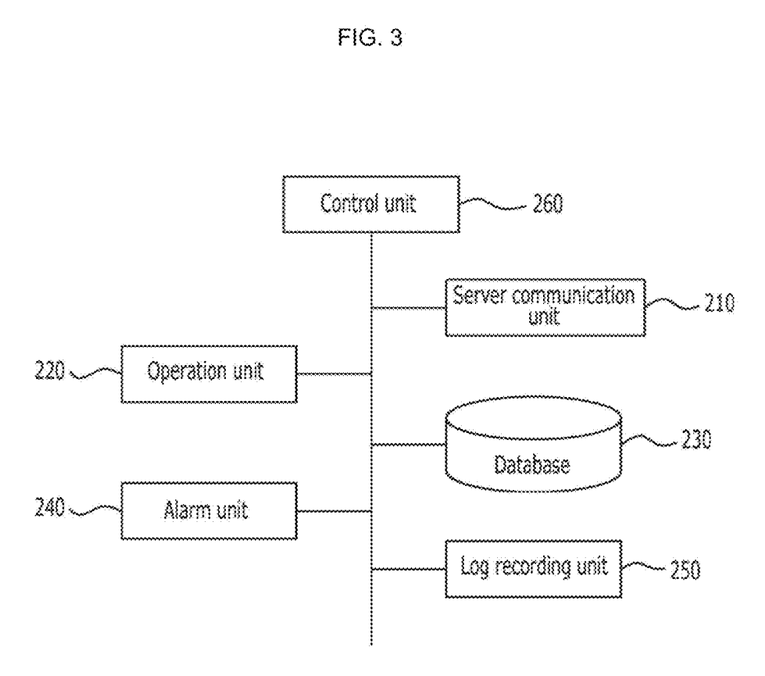
FIG. 3 is a block diagram showing a detailed configuration of a server in accordance with an embodiment of the present invention.

As shown in FIG. 3, the server 200 includes a server communication unit 210, an operation unit 220, and a database 230.

The server communication unit 210 corresponds to the chair communication unit 120 of the motion chair 100 and functions to receive physical data from the motion chair 100 and send a motion control command generated by the server 200 to the motion chair 100.

The operation unit 220, that is, one of the elements of the server 200, functions to compare the physical data, received from the motion chair 100, with reference data stored in the database 230, determine whether a motion of the motion chair 100 needs to be controlled based on a result of the comparison, and generate a motion control command based on a result of the determination. That is, the operation unit 220 is a core element for controlling the motion chairs 100 installed in a theater, such as determining whether the motion chair 100 will be controlled and generating a motion control command.

The operation unit 220 basically performs two functions.

Regarding the first function, the operation unit 220 determines whether a motion of the motion chair 100 needs to be controlled based on physical data received from the motion chair 100. In this case, the operation unit 220 compares physical data received from the motion chair 100 with reference data stored in the database 230 and determines whether there is now a sudden change in the physical state of an audience. In this case, the reference data is compared with the current physical data of the audience and has been obtained when the audience is in the stable state. For example, the reference data may be physical data obtained when the motion chair 100 is in the non-driving state.

The operation unit 220 compares the current physical data of an audience, received from the motion chair 100, with reference data. The operation unit 220 may determine that the motion chair 100 needs to be controlled if, as a result of the comparison, it is found that a difference between the current physical data and the reference data exceeds a set range and may determine that the motion chair 100 does not need to be controlled if, as a result of the comparison, it is found that the difference is within the set range.

Regarding the second function, after it is determined that the motion chair 100 needs to be controlled, the operation unit 220 generates a control command for the motion chair 100, that is, a motion control command. As described above, the motion control command may include a variety of types of attribute information for controlling a motion of the motion chair 100 and may include attribute information, such as directivity, a motion angle, motion speed, and acceleration.

A process of determining, by the operation unit 220, whether a motion of the motion chair 100 needs to be controlled and a process of generating a motion control command are described in more detail later in connection with detailed embodiments.

The database 230, that is, another element of the server 200, functions to receive physical data from the motion chair 100 and store the received physical data as reference data. The database 230 may store the physical data of an audience, transmitted by the motion chair 100 in the non-driving state, as reference data.

The server 200 in accordance with an embodiment of the present invention may further include an alarm unit 240 for monitoring the physical data of a user who has been seated in the motion chair 100 in real time and outputting a warning message to the user or an operator when detecting an abnormal symptom in addition to the elements for controlling the motion chair 100.

Specifically, the alarm unit 240 functions to obtain the physical data of a user from the motion chair 100 and output a warning message to the user or an operator in various ways when the obtained physical data exceeds a reference range. For example, if the heart rate of a user exceeds a reference value and remains intact for several seconds, the alarm unit 240 may provide notification of an emergency situation by outputting a warning message to the user and an operator. In this case, a method of driving a lamp or buzzer provided in a projection room or a method of sending an SMS message to each of the terminals of staffs in a theater or sending a message to an application installed in each of the terminals may be taken into consideration as a method of outputting, by the alarm unit 240, the warning message. Furthermore, the outputted message or the transmitted message may include a theater booth and a seat number in which a user who has an abnormal symptom is placed so that the staffs may rapidly take measures against the user.

The server 200 in accordance with another embodiment of the present invention may further include a log recording unit 250 for recording the physical data of audiences who watch 4D content.

The log recording unit 250 may match up the motion attributes of the motion chair 100, that is, the motion type, motion intensity, and vibration intensity of the motion chair 100, with the physical data of a user when the motion attributes are executed and store them. Furthermore, the physical data of a user according to the motion attributes collected as described above may be used as reference data when other 4D content or 4D effects are produced in the future. For example, if there is a sudden change in the physical data of audiences when a specific motion of the motion chair 100 is provided, the specific motion may become an object to be analyzed by a content producer and used as reference data when new 4D content or 4D effects are produced.

The server 200 may further include a control unit 260 for controlling the server communication unit 210, the operation unit 220, the database 230, the alarm unit 240, and the log recording unit 250.

Figure 4:
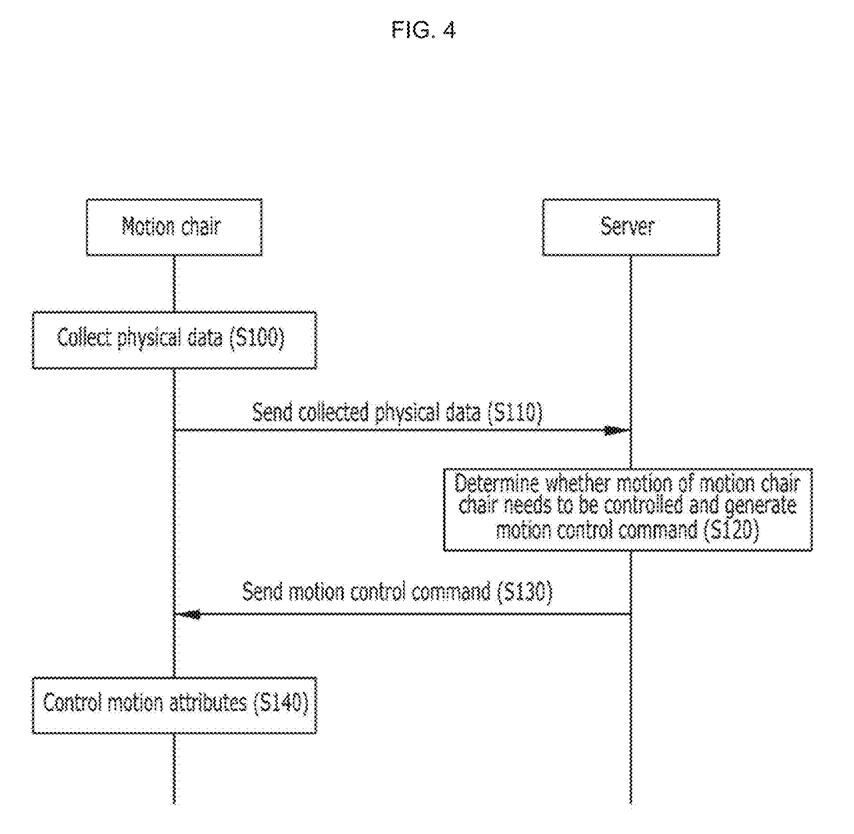
FIG. 4 is a flowchart illustrating a method of controlling a motion chair in accordance with an embodiment of the present invention.

FIG. 4 is a flowchart illustrating a method of controlling the motion chair 110 in the system in accordance with an embodiment of the present invention.

Referring to FIG. 4, first, the motion chair 100 collects the physical data of an audience at step S100 and sends the collected physical data to the server 200 at step S110. In this case, the motion chair 100 may collect the physical data of the audience at a predetermined point of time, on a predetermined time, and in a predetermined cycle according to user configurations and send the collected physical data. For example, the motion chair 100 may obtain the heart rate of the audience for several seconds from the start of movie content and monitor the heart rate of the audience at an interval of 10 minutes, that is, a predetermined cycle. In some embodiments, the motion chair 100 may be implemented to monitor the heart rate of the audience only in the state in which a motion is provided to the audience in association with 4D movie content, that is, in the driving state.

After collecting the physical data from the motion chair 100, the server 200 determines whether a motion of the motion chair 100 needs to be controlled with reference to reference data at step S120. If, as a result of the determination, it is determined that a motion of the motion chair 100 needs to be controlled because a difference between the physical data of the audience and the reference data exceeds a set range, the server 200 generates a motion control command, for example, a motion control command including control commands for the motion angle, motion speed, and motion direction of the motion chair 100 and sends the motion control command to the motion chair 100 at step S130. If, as a result of the determination, it is determined that a motion of the motion chair 100 does not need to be controlled because the difference between the physical data of the audience and the reference data is within the set range, the server 200 remains in a standby state without performing a separate function.

In response to the motion control command received from the server 200, the motion chair 100 controls motion attributes based on the control commands included in the motion control command at step S140.

A method of internally controlling, by the server 200 in accordance with an embodiment of the present invention, the motion chair 100 using what operation process is described below with reference to FIGS. 5 and 6.

Figure 5:
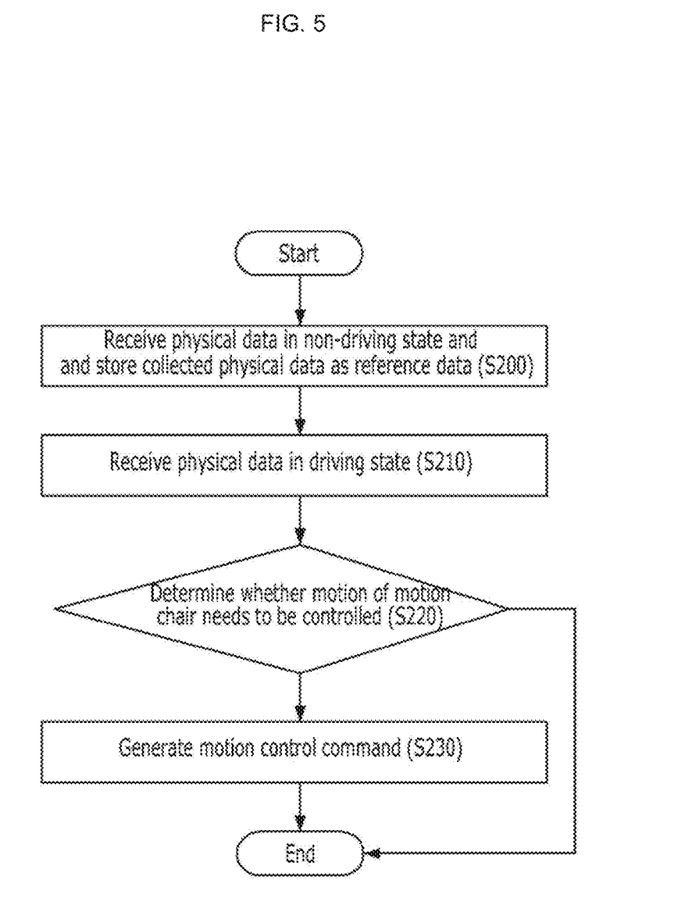
FIGS. 5 and 6 are diagrams showing an operation process of controlling, by the server, the motion chair in accordance with an embodiment of the present invention.
Figure 6:
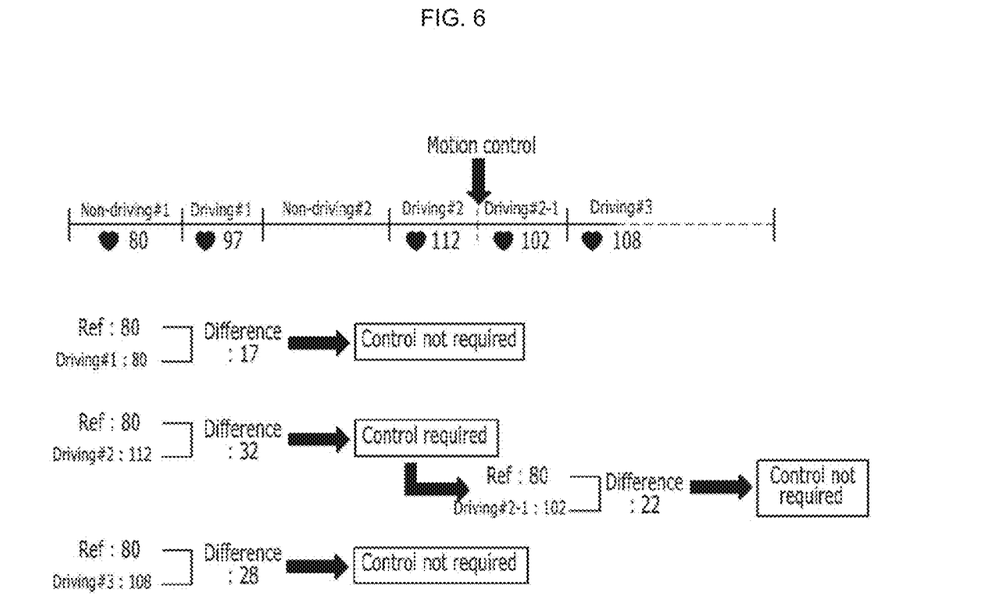

In an embodiment of FIGS. 5 and 6, the physical data of an audience is obtained simultaneously with the start of the screening of 4D content and stored as reference data, and the motion chair 100 is controlled based on the reference data. In this case, the reason why the physical data of the audience is stored as the reference data simultaneously with the start of the screening of the 4D content is to use physical data in the state in which each audience is stable, that is, in the state in which the motion chair 100 has not been driven, as the reference data.

FIG. 5 is a flowchart illustrating a method of obtaining, by the server 200 in accordance with an embodiment of the present invention, physical data simultaneously with the start of content and determining whether a motion of the motion chair 100 needs to be controlled. The server 200 controls the motion chair 100 in such a manner that it collects the physical data of an audience when the motion chair 100 is in the non-driving state simultaneously with the start of content start and stores the collected physical data as reference data at step S200, receives the physical data of the audience when the motion chair 100 is in the driving state while the content is played back at step S210, compares the received physical data with the reference data and determines whether a motion of the motion chair 100 needs to be controlled at step S220, and generates a motion control command at step S230 or terminates the process based on a result of the determination.

FIG. 6 diagrammatically shows the embodiment of FIG. 5 in order to help understanding.

Referring to FIG. 6, first, the server 200 obtains the heart rate 80 of an audience from the motion chair 100 simultaneously with the state of 4D movie content and stores the obtained heart rate 80 as reference data. In the present embodiment, it is assumed that a motion of the motion chair 100 is determined to be needed to be controlled if a difference between the reference data and physical data, that is, a difference between a heart rate when the motion chair 100 is in the non-driving state and a heart rate when the motion chair 100 is in the driving state, exceeds 30.

In a first driving section, that is, in a driving section#1, after the start of the screening of the content, the server 200 receives the heart rate 97 of the audience, determines that a difference between the heart rate 97 and the reference data 80 is within the set range of 30 because the difference is 17, and thus does not control a motion of the motion chair 100. In this case, the motion chair 100 is driven based on motion attributes configured when the content was produced.

The server 200 does not receive the physical data of the audience in the non-driving section#2 of the motion chair 100 subsequent to the driving section#1, but receives the physical data of the audience in a subsequent driving section#2.

If the heart rate of the audience received in the driving section#2 is 112, the server 200 may determine that a motion of the motion chair 100 needs to be controlled because a difference between the heart rate 112 and the reference data 80 exceeds 30 through internal operation. Accordingly, the server 200 generates a motion control command in order to control motion intensity of the motion chair 100 and sends the motion control command to the motion chair 100.

In the driving section#2, the server 200 may continue to receive the heart rate of the audience from the motion chair 100 and may continue to compare a received heart rate with the reference data and to generate a motion control command for the motion chair 100 until a difference between the received heart rate and the reference data is within the set range. For example, if the heart rate of the audience received in the driving section#2 remains high, the server 200 may set motion attributes in such a way as to continuously decrease motion intensity of the motion chair 100 when generating a motion control command.

Likewise, in a driving section#3, the server 200 determines whether a motion of the motion chair 100 needs to be controlled based on a difference between a received heart rate and the reference data.

Another operation process of the server 200 is described below with reference to FIGS. 7 and 8.

Figure 7:
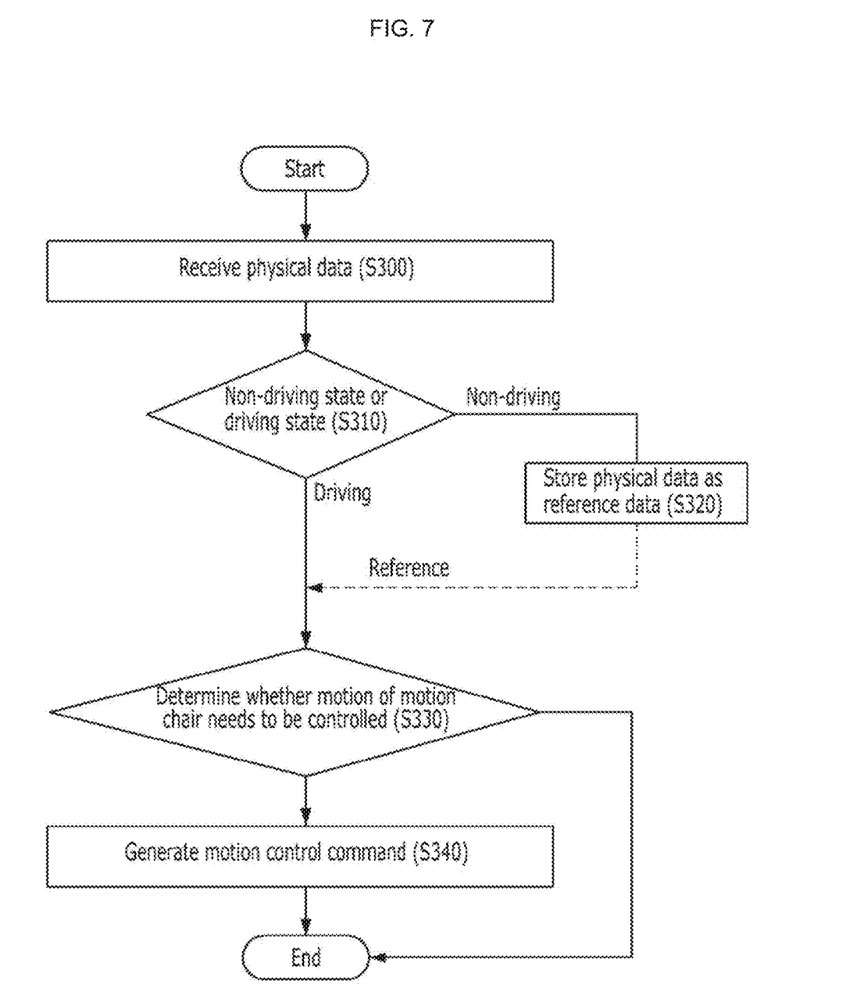
FIGS. 7 and 8 are diagrams showing an operation process of controlling, by the server, the motion chair in accordance with another embodiment of the present invention.
Figure 8:
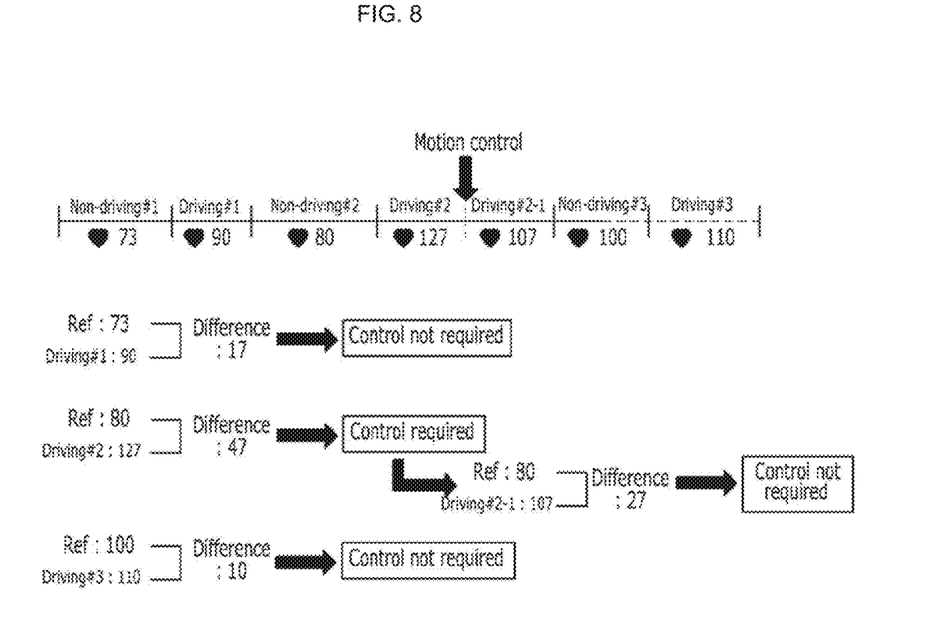

In an embodiment of FIGS. 7 and 8, unlike in the embodiment of FIGS. 5 and 6, more physical data for an audience is obtained and received, and the audience is monitored and a motion of the motion chair 100 is controlled in real time.

That is, in the embodiment of FIGS. 7 and 8, the physical data of an audience is received and stored as reference data and updated whenever the motion chair 100 is in the non-driving state. The physical data of the audience when the motion chair 100 is in the driving state is compared with the updated reference data. Accordingly, a motion of the motion chair 100 can be controlled more accurately in accordance with the state of the audience.

Referring to FIG. 7, first, the server 200 receives the physical data of an audience from the motion chair 100 at step S300. If the received physical data has been obtained when the motion chair 100 was in the non-driving state at step S310, the server 200 stores the received physical data as reference data at step S320. In contrast, if the received physical data has been obtained when the motion chair 100 was in the driving state at step S310, the server 200 determines whether a motion of the motion chair 100 needs to be controlled using the received physical data at step S330.

The server 200 generates a motion control command at step S340 or terminates the process based on a result of the determination, as in the aforementioned embodiment.

FIG. 8 diagrammatically shows the embodiment of FIG. 7 in order to help understanding. In the embodiment of FIG. 8, as in FIG. 6, it is based on the premise that a motion of the motion chair 100 needs to be controlled if a difference between reference data and physical data exceeds 30.

Referring to FIG. 8, first, the server 200 receives the heart rate 73 of an audience collected when the motion chair 100 is in the non-driving state, that is, in a non-driving section#1, and stores the received heart rate as reference data. Next, the server 200 receives a heart rate 90 when the motion chair 100 is in a driving section#1 and compares the received heart rate 90 with the reference data of 73. The server 200 determines that a motion of the motion chair 100 does not need to be controlled based on a result of the comparison and does not perform a function, such as the generation of a separate motion control command.

The server 200 receives the heart rate 80 of the audience when the motion chair 100 is in a non-driving section#2 and updates the reference data with the received heart rate 80. After the update of the reference data, the server 200 receives a heart rate 127 in a driving section#2, determines that a motion of the motion chair 100 needs to be controlled based on a result of a comparison between the heart rate 127 and the updated reference data 80, and generates a motion control command. In this case, in the driving section#2, the server 200 continues to receive the heart rate of the audience and to modify and generate a motion control command until a difference between a received heart rate and the reference data is within a set range, as in the afore-mentioned embodiment.

In a non-driving section#3, the server 200 receives a heart rate 100 and updates the reference data with the received heart rate. A subsequent process is repeatedly performed as described above.

As described above, the embodiment of FIGS. 7 and 8 is advantageous in that a motion of the motion chair 100 can be controlled more accurately because the physical state of an audience is positively monitored and the state of the audience is updated in a short cycle.

Although some embodiments and applications of the present invention have been illustrated and described above, the present invention is not limited to the afore-mentioned specific embodiments and applications, and those skilled in the art to which the present invention pertains may modify the present invention in various ways without departing from the gist of the present invention written in the claims. Such modified embodiments should not be interpreted as being distinct from the technical spirit or prospect of the present invention.

The invention claimed is:

1. A system for controlling a motion chair, comprising:
   the motion chair configured to
      collect physical data of an audience,
      send the physical data to a server, and
      control motion attributes in response to a motion control command received from the server; and
   the server configured to
      receive the physical data from the motion chair,
      determine whether a motion of the motion chair needs to be controlled based on the physical data,
      generate the motion control command based on a result of the determination, and
      send the motion control command to the motion chair,
   wherein the motion chair is configured to,
      in a non-driving state in which a motion of the motion chair is not driven by the motion chair, collect physical data of the audience,
      in a driving state in which the motion of the motion chair is driven by the motion chair, collect the physical data of the audience, and
      send the collected physical data of the audience to the server, and
   wherein the server is configured to
      store the physical data collected in the non-driving state as reference data,
      compare the physical data collected in the driving state with the stored reference data,
      determine whether a difference between the physical data collected in the driving state and the reference data is within a predetermined range, and
      control, by sending a motion control command to the motion chair, the motion of the motion chair based on a result of the determination.

2. The system of claim 1, wherein the physical data comprises a heart rate, a pulse wave, a brainwave, a body temperature, blood pressure, or an amount of moisture.

3. A method of controlling a motion chair, the method performed by a system including the motion chair and a server, the method comprising:
   collecting, by the motion chair, physical data of an audience in a non-driving state in which a motion of the motion chair is driven by the motion chair, and sending the physical data to a server;
   storing, by the server, the physical data collected in the non-driving state as reference data;
   collecting, by the motion chair, the physical data of an audience in a driving state in which the motion of the motion chair is not driven by the motion chair, and sending the physical data to a server;
   comparing, by the server, the received physical data collected in the driving state with the stored reference data and determining whether a motion of the motion chair needs to be controlled;
   sending, by the server, a motion control command to the motion chair based on a result of the determination; and
   controlling, by the motion chair, motion attributes in response to the motion control command.

\* \* \* \* \*